United States Patent [19]
Umemoto et al.

[11] Patent Number: 5,450,442
[45] Date of Patent: Sep. 12, 1995

[54] DIGITAL RADIO TELEPHONE APPARATUS HAVING AN EQUALIZER SELECTIVELY EMPLOYED IN THE APPARATUS

[75] Inventors: Yuji Umemoto; Shinichi Suizu; Kaoru Tatsumi; Mutsumu Serizawa, all of Tokyo, Japan

[73] Assignee: Kabushiki Kaisha Toshiba, Kawasaki, Japan

[21] Appl. No.: 786,886

[22] Filed: Nov. 1, 1991

[30] Foreign Application Priority Data

Nov. 2, 1990 [JP] Japan ................. 2-298234
Nov. 13, 1990 [JP] Japan ................. 2-303878

[51] Int. Cl.$^6$ ............ H04L 25/00; H04L 27/00
[52] U.S. Cl. ....................... 375/230; 375/354
[58] Field of Search .............. 375/12, 11, 14, 75, 375/82, 13, 15, 16, 5; 455/200.1, 267, 177.1, 33.1; 333/18, 28 R; 364/724.19, 724.2; 381/103; 379/59

[56] References Cited

U.S. PATENT DOCUMENTS

| | | | |
|---|---|---|---|
| 4,355,401 | 10/1982 | Ikoma et al. | 375/5 |
| 4,941,155 | 7/1990 | Chuang et al. | 375/84 |
| 5,065,410 | 11/1991 | Yoshida et al. | 375/12 |
| 5,111,480 | 5/1992 | Sarkoezi | 375/102 |
| 5,113,411 | 5/1992 | Yoshida et al. | 375/13 |
| 5,119,502 | 6/1992 | Kallin et al. | 455/70 |
| 5,155,742 | 10/1992 | Ariyavisitakul et al. | 375/14 |
| 5,159,282 | 10/1992 | Serizawa et al. | 329/316 |

FOREIGN PATENT DOCUMENTS

62-164579 7/1987 Japan.
64-8750 1/1989 Japan.

*Primary Examiner*—Stephen Chin
*Assistant Examiner*—Hai H. Phan
*Attorney, Agent, or Firm*—Banner & Allegretti, Ltd.

[57] ABSTRACT

A digital radio telephone apparatus adaptively employs an equalizer for compensating for signal distortion of received signals. A switch may be provided at an output terminal of the equalizer so that the equalized signals are selectively applied to the decoder. The equalizer may be rendered to be operative when the quality of received radio frequency signals is lower than a prescribed level and rendered to be inoperative when the quality of received radio frequency signals is not lower than the prescribed level. The equalizer may be rendered to be inoperative for a predetermined time period from the time a digital speech radio link establishment operation is initiated. In the event that a radio link is established by TDMA (Time Division Multiple Access), the equalizer may be rendered to be operative in synchronization with a time slot assigned to the apparatus. The equalizer is not suppled with electric power or clock while the equalizer is rendered to be inoperative.

1 Claim, 9 Drawing Sheets

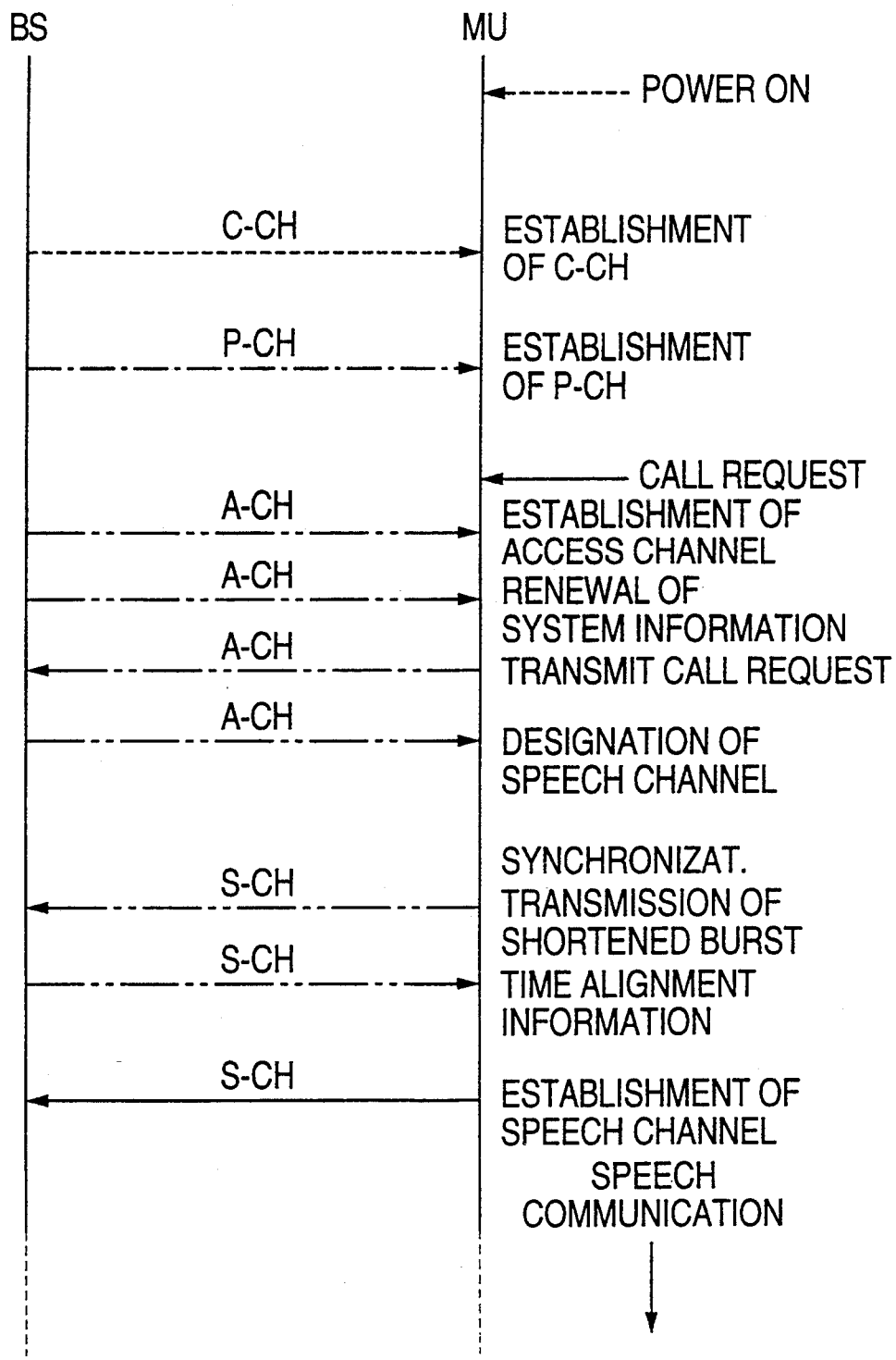

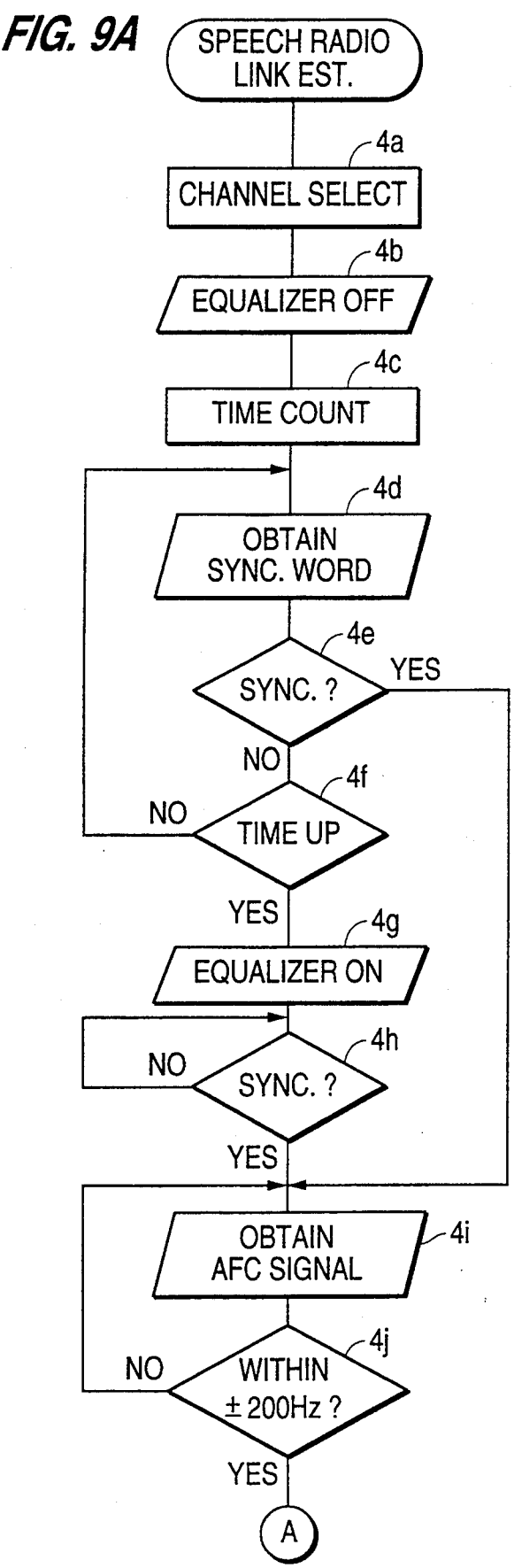

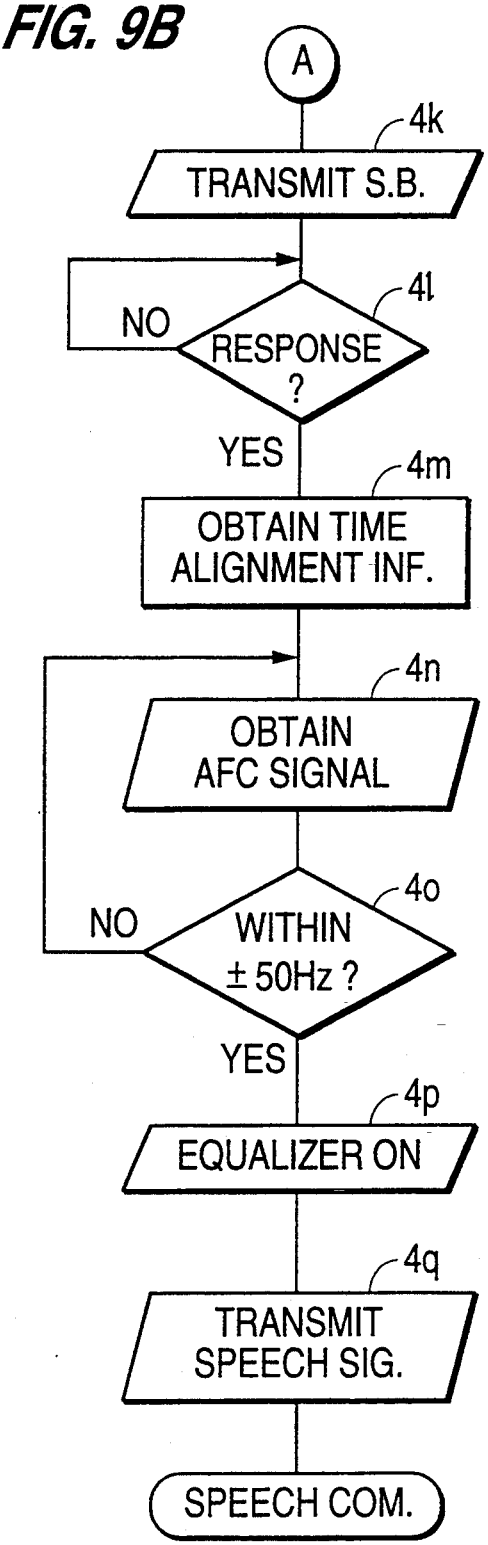

DIGITAL RADIO TELEPHONE APPARATUS HAVING AN EQUALIZER SELECTIVELY EMPLOYED IN THE APPARATUS

BACKGROUND OF THE INVENTION

1. Field of the Invention

The present invention relates to a digital radio telephone apparatus used in a cellular radio system, and more particularly, to a digital radio telephone apparatus having an equalizer selectively employed for compensating for signal distortion caused by the multipath fading.

2. Description of the Related Art

As the number of subscribers in cellular radio systems increase, digital cellular systems are desirable in addition to the presently available analog cellular systems. In the digital cellular system, the speech signals may be encoded into digital signals and transmitted at a more efficient transmission rate. Due to the mobility of the mobile unit to be served by the system and geographical conditions, however, the transmitted signals may be degraded when mobile units receive the signals. This problem is called a multipath fading problem. To overcome this problem, an equalizer may be employed in the apparatus. If the equalizer is employed in the apparatus, wave distortion caused by interference between signals directly transmitted and delay signals indirectly transmitted may be compensated for by the equalizer.

However, when the mobile unit moves near the base station, the fading problem is not so serious. Rather, near the base station, the bit error rate measured when the equalizer is employed may be higher than the bit error rate measured when the equalizer is not employed. Still, if the equalizer is formed in a chip of CMOS (Complementary Metal Oxide Semiconductor), electrical power is greatly consumed in the chip while the chip is in an operational state. Further, while signals applied to the equalizer fluctuate over a wide frequency range, the equalizer does not operate accurately and thereby it takes time for the mobile unit to establish a radio link with a base station.

SUMMARY OF THE INVENTION

It is accordingly an object of the present invention to provide a digital radio telephone apparatus wherein an equalizer which compensates for signal distortion of received signals is adaptively employed.

It is another object of the present invention to provide a digital radio telephone apparatus which selectively employs an equalizer which compensates for signal distortion of received signals while conserving the electric power consumed in the apparatus.

It is still another object of the present invention to provide a digital radio telephone apparatus capable of establishing a digital radio link with a base station rapidly while adaptively employing an equalizer.

To achieve the objects of the present invention as embodied and described herein, the digital radio telephone apparatus according to the present invention comprises a receiver for receiving radio frequency signals, a demodulator coupled to the receiver for demodulating the received radio frequency signals into baseband signals and outputting demodulated baseband signals, an equalizer for equalizing the demodulated baseband signals and outputting equalized signals, a decoder selectively coupled to the output of the demodulator or the equalizer for decoding signals applied to the decoder and outputting analog signals corresponding to the radio frequency signals, and a controller for selectively controlling the equalizer to be operative so that the demodulated baseband signals are applied to the equalizer and the equalized signals are applied to the decoder and inoperative so that the demodulated baseband signals are applied to the decoder. The controller controls the equalizer to be operative when the quality of the radio frequency signal is lower than a prescribed level and to be inoperative when the quality of the radio frequency signal is higher than the prescribed level. The controller may comprise a switch provided at an output terminal of the equalizer for selectively applying the equalized signals to the decoder. The equalizer may not be supplied with electric power while the equalizer is rendered to be inoperative. The equalizer may be rendered to be inoperative for a predetermined time period from the time when a digital speech radio link establishment operation is initiated. If a radio link is established by TDMA (Time Division Multiple Access), the equalizer may be rendered to be operative in synchronization with a time slot assigned to the apparatus. In the event that the equalizer consists of a chip of CMOS, the controller controls a clock generator so that the clock is not supplied to the chip of CMOS when the equalizer in rendered to be inoperative. The equalizer may be formed in a portion of a chip of the CMOS and the controller may control the clock generator so that the clock is not supplied to the portion of the chip of CMOS when the equalizer is rendered to be inoperative.

BRIEF DESCRIPTION OF THE DRAWINGS

FIG. 8 is a sequence diagram for explaining operations in a radio link establishment in accordance with the third embodiment.

FIG. 9A and 9B are flow charts showing operations for establishing a speech radio link according to the present invention.

DETAILED DESCRIPTION OF THE PREFERRED EMBODIMENTS

Figure 1:
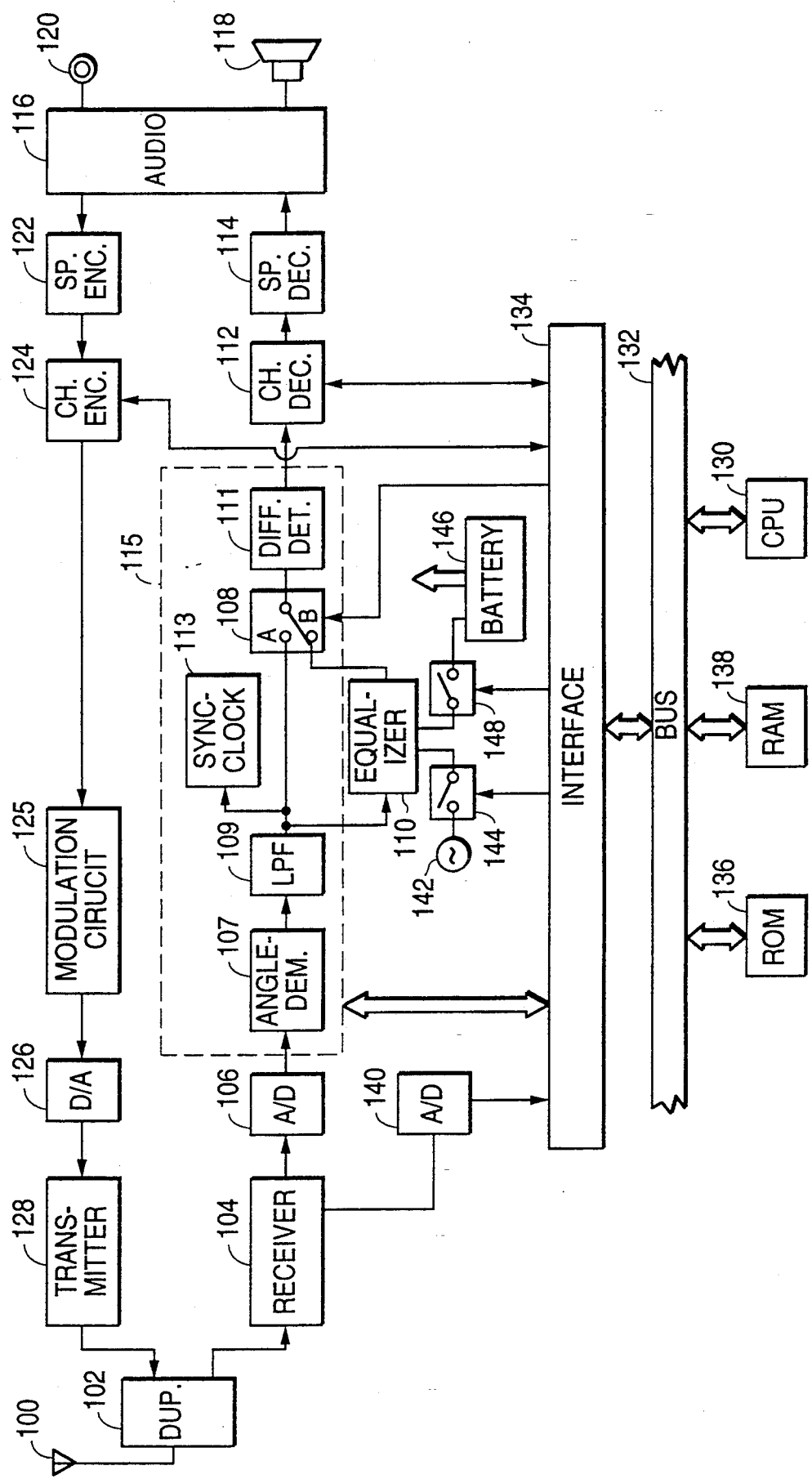
FIG. 1 is a block diagram of a digital cellular radio telephone according to a first embodiment of the present invention.

FIG. 1 shows a block diagram of a digital cellular radio telephone according to a first embodiment of the present invention. The digital cellular radio telephone may be used in a cellular radio system. Radio frequency signals are received at antenna 100 and applied to a receiver circuit 104 through a duplexer 102. In receiver circuit 104, the radio frequency signals, which are preferably within a frequency range of 800–900 MHz, are frequency demodulated into baseband signals. The baseband signals are converted into digital signals by A/D (analog-digital) converter 106. After the converted signals are angle demodulated by an angle-demodulation circuit 107, the demodulated signals pass through a low-pass filter 109. Whether the output signals pass through equalizer 110 or not depends on the closure or open state of switch 108. The output signals of switch 108 are applied to differential detection circuit 111. In differential detection circuit 111, digital modulation signals differentially modulated by ¶/4 shifted DQPSK are demodulated by a differential detection demodulation method.

The demodulated signals are deinterleaved and error correction operations are performed on the deinterleaved signals in channel decoder 112. The output signals from channel decoder 112 are applied to speech decoder 114 and decoded into digital speech signals. The output digital signals from speech decoder 114 are applied to audio circuit 116 and converted into analog speech signals. The analog speech signals are applied to speaker 118, thereby the speech sounds based on the received signals are generated from speaker 118.

A demodulation circuit section 115 comprises angle demodulation circuit 107, low-pass filter 109, sync-clock regeneration circuit 113, switch 108, and differential detection circuit 111. Demodulation circuit section 115 and a modulation circuit section 125 may be integrated into a chip. The sync-clock regeneration circuit 113 is served for establishing a synchronization with the signals transmitted from a base station and identifying time slots for the radio telephone by extracting a synchronization word and a slot designation signal out of the received signals.

Speech signals applied at microphone 120 are input to speech encoder 122 through audio circuit 116. Encoded speech signals from speech encoder 122 are applied to channel encoder 124. In channel encoder 124, an error correcting code is added to the encoded speech signals and the speech signals with the error correcting code are interleaved. The interleaved signals from channel encoder 124 are differentially encoded by ¶/4 shifted DQPSK and angle modulated in the modulation circuit section 125. The output signals from the modulation circuit section 125 are applied to D/A converter 126 and converted into analog signals from digital signals therein. The output signals from D/A (digital-analog) converter 126 are applied to a transmitter 128. Transmitter 128 frequency modulates the signals from D/A converter 126 into radio frequency signals of 800–900 MHz and power amplifies the radio frequency signals. The power amplified radio frequency signals are transmitted through duplexer 102 and antenna 100.

CPU (Central Processing Unit) 130 controls operations of each section of the apparatus through bus 132 and interface 134. CPU 130 is connected with ROM (Read Only Memory) 136 for storing execution programs and a RAM (Random Access Memory) 138 for storing various kinds of data through bus 132.

Figure 2:
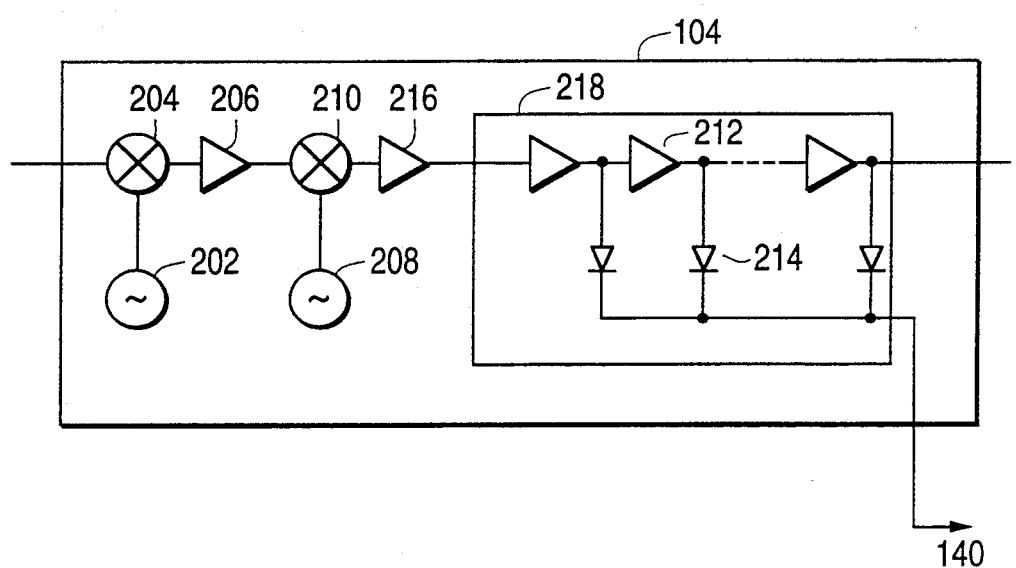
FIG. 2 is a block diagram of the receiver shown in FIG. 1.

In receiver 104, the strength of the received signals is detected and the detected signal is applied to A/D converter 140. The detected signal is converted into a digital signal by A/D converter 140 and sent to CPU 130 by way of interface 134 and bus 132. FIG. 2 shows an arrangement of receiver 104. Receiver 104 comprises first local oscillator 202, mixer 204 for combining an incoming radio-frequency signal with the signal from first local oscillator 202, first I-F (intermediate-frequency) amplifier 206 for amplifying the output signal of mixer 204, second local oscillator 208, mixer 210 for combining the output signal of first I-F amplifier 206 with signals from second local oscillator 208, second I-F amplifier 216 for amplifying the output signal of mixer 210, and an I-F integrated circuit (IC) 218. I-F IC 218 comprises a plurality of linear amplifiers 212 for amplifying received signals and a plurality of diodes 214 for detecting the strength of received signals. Each of the plurality of diodes 214 is connected to the output of each of linear amplifiers 212. The output of diodes 214 is accumulated on a line and applied to A/D converter 140.

Equalizer 110 is a non-linear equalizer consisting of a feed-forward filter having several tap coefficients and a feed-back filter having several tap coefficients. The number of the tap coefficients of the feed-forward filter is equal to the number of the tap coefficients of the feed-back filter.

Equalizer 110 may be constituted by a CMOS (Complementary Metal Oxide Semiconductor) logic device. Clock generator 142 is connected to equalizer 110 and a pulse signal of a predetermined frequency is provided thereto as a clock. Switch 144 is provided in a clock supply path between clock generator 142 and equalizer 110 so as to interrupt supplying the clock to equalizer 110 under the control of CPU 130. Battery 146 is a power source for supplying all the sections of the apparatus including equalizer 110 with electric power. Switch 148 is provided in a power supply path between battery 146 and equalizer 110 so as to interrupt supplying power to equalizer 110 under the control of the CPU 130.

Figure 3:
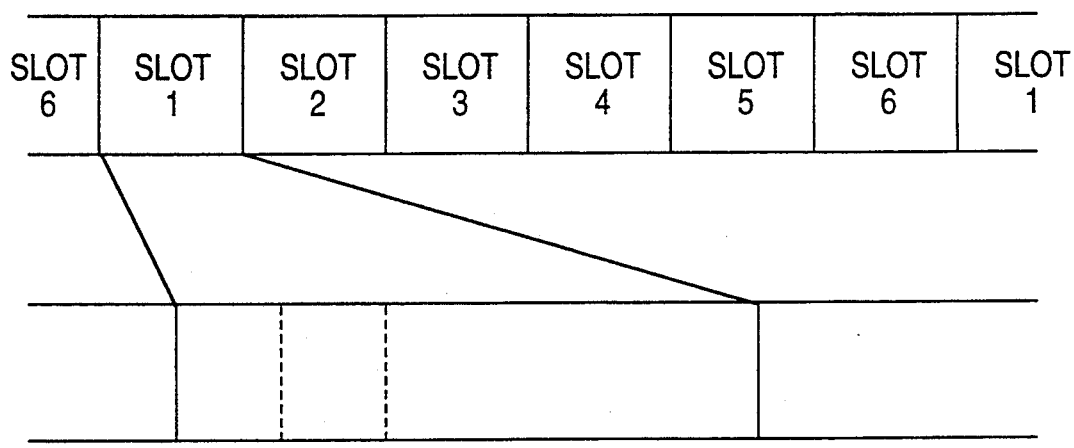
FIG. 3 is a signal format of digital modulation signals transmitted by time-division multiple transmission in accordance with the first embodiment of the present invention.

Next, referring to FIGS. 3 and 4, the operations of the cellular radio telephone according to the first embodiment of the present invention will be described. FIG. 3 shows a signal format of digital modulated signals transmitted by time-division multiple (TDM) transmission. For example, a speech channel may be divided into six timeslots for the TDMA communication between the base station and the cellular radio telephone. Once a speech radio link using a speech channel is established, two of the six timeslots in a speech channel are occupied for the speech radio link. A synchronization word and timeslot designation information are included in each timeslot and used for acquiring the synchronization with signals transmitted from the base station and for identifying whether a particular timeslot is addressed to the cellular radio telephone.

Figure 4:
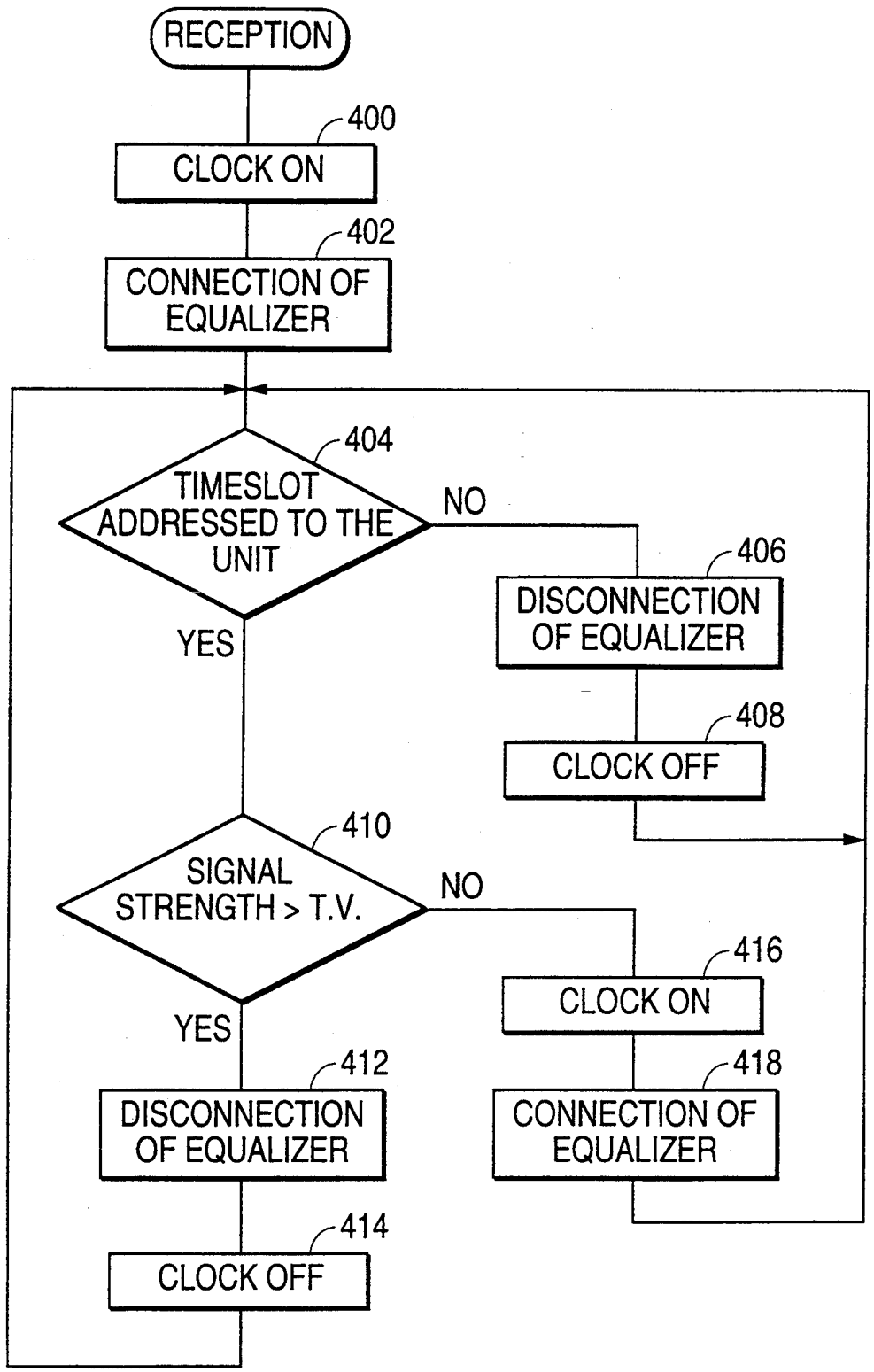
FIG. 4 is a flow chart showing a processing algorithm for reception operation of the cellular radio telephone in accordance with the first embodiment of the present invention.

FIG. 4 is a flow chart showing a processing algorithm for a reception operation of the cellular radio telephone in accordance with the first embodiment of the present invention. In this operation, it is assumed that a radio link using a speech radio channel has already been established.

In an initial state, a clock is applied to equalizer 110 (step 400) and switch 108 connects the output of equalizer 110 to the input of differential detection circuit 111, i.e., an output B is selected under the control of CPU 130 (step 402). Radio frequency signals received at antenna 100 pass through duplexer 102, receiver 104, A/D converter 106, equalizer 110, and differential detection circuit 111 and are input to channel decoder 112. The sync-clock regeneration circuit 113 extracts a synchronization word and a slot designation word out of the received signals, thereby synchronization with the received signals is achieved and it is determined whether a particular slot is addressed to the radio telephone (step 404). If the slot is not addressed to the radio telephone, CPU 130 controls switches 108 and 144 so that an output A from low-pass filter 109 is coupled to differential detection circuit 111, and the clock supply from clock generator 142 to equalizer 110 is terminated (step 406 and 408).

In the step 404, in the event that a slot is determined to be addressed to the radio telephone, CPU 130 compares the strength value of the received signal which is output from A/D converter 140 with a threshold value which is stored in RAM 138 or an EPROM in advance (step 410). If CPU 130 determines that the strength value of the received signal is stronger than the threshold value, CPU 130 controls switches 108 and 144 so that the output terminal A is coupled to differential detection circuit 111 and the application of clock from clock generator 142 to equalizer 110 is terminated (step 412 and 414). Accordingly, when the radio frequency signals are received in good condition, thereby the strength of the received signals is strong, the received signals are demodulated by differential detection without passing through equalizer 110.

In step 410, if the strength value of the received signals is not stronger than the threshold value, CPU 130 controls switches 108 and 144 so that a clock signal is applied to equalizer 110 and the output terminal B is coupled to differential detection circuit 111(stop 416 and 418). Accordingly, when the radio frequency signals are not received in good condition, thereby the strength of the received signals is weak, the received signals are demodulated by differential detection circuit 111 after distortion of the received signal is compensated for by equalizer 110.

According to this embodiment, in the event that the radio telephone is located near a base station, thereby the radio frequency signals directly transmitted from the base station are strong enough compared to the strength of the delayed waves which are indirectly transmitted by way of multiple paths, an equalizer is not used. This is because it is not necessary to consider influences caused by the delayed waves. On the other hand, as the radio telephone goes far away from the base station, the strength of the received signals becomes weaker and the differences in strength between the direct radio wave from the base station and the delayed waves also becomes smaller. As the strength of the received direct radio waves decreases, it becomes more difficult to distinguish the direct radio waves from the delayed waves. In this event, in accordance with the reception operations, because the signal distortion of the received signals is compensated for by equalizer circuit 110, differential detection and signal decode may be performed on the received signals with less signal distortion.

Still, when equalizer 110 is not used, a clock signal is not supplied to the CMOS logic device comprising equalizer 110. Generally, electric power is consumed every time a switching operation is performed based on the supplied clock signals in the CMOS logic device. When the clock is not applied to the device, the switching operation does not occur. Consequently, while equalizer 110 is rendered to be inoperative without the supply of clock, the electric power is not consumed in equalizer 110.

Equalizer 110 may be interposed in the signal path of the received signals based on the other conditions. For example, the signal distortion of the received signals may be compensated for depending on the bit error rate of the received signals. In other words, the received signals may be demodulated by differential detection circuit 111 without using equalizer 110 when the bit error rate is not higher than a predetermined value. Contrary, when the bit error rate is higher than the predetermined value, the received signals are demodulated by differential detection circuit 111 after signal distortion of the received signals is reduced by equalizer 110. In this event, if the clock is not supplied to equalizer 110 while equalizer 110 is not used, power consumption may be also conserved.

Figure 5:
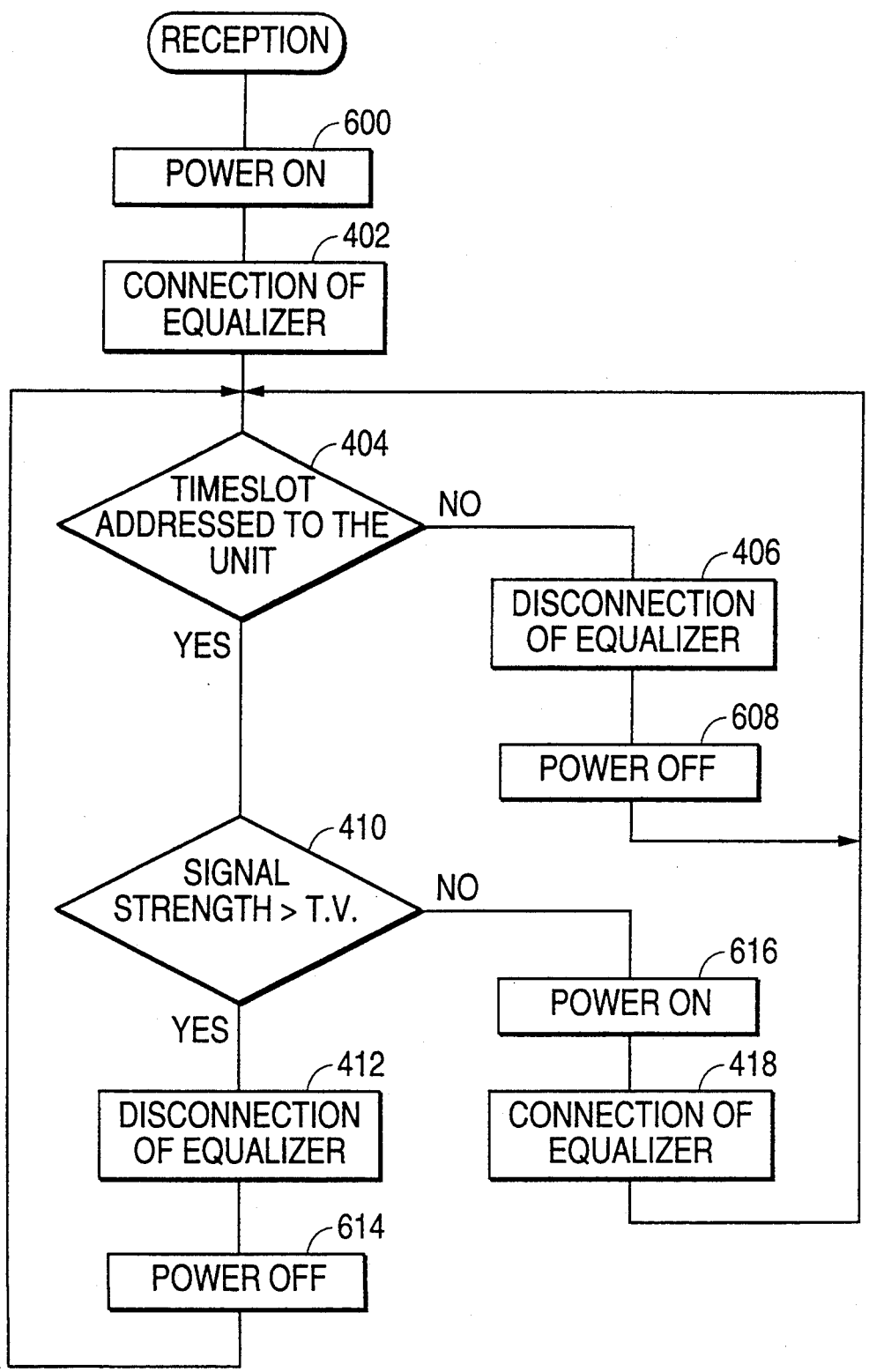
FIG. 5 is a flow chart showing a second processing algorithm for reception operation of a cellular radio telephone in accordance with a second embodiment of the present invention.

Next, referring to FIG. 5, a reception operation according to a second embodiment of the present invention will be described. The same reference numbers as the above mentioned embodiment are assigned with respect to the steps in which the same operations as the above mentioned embodiment are performed. In this embodiment, when equalizer 110 is not used, power supply to the equalizer is terminated, while clock supply to the equalizer is terminated in the first embodiment. Thus, steps 608 and 614 instead of the steps 408 and 414 are provided for interrupting power supply to equalizer 110 by opening switch 148. Responsively, steps 600 and 616 instead of the steps 400 and 416 are provided for initiating the power supply to equalizer 110 by closing switch 148. According to the second embodiment as shown in FIG. 5, electric power may be conserved since the electric power is not dissipated in equalizer 110 while equalizer 110 is not used.

In the above mentioned embodiments, the signal strength of the received signals is preferably checked to determine if equalizer 110 is to be employed in the apparatus. However, step 410 for the determination of signal strength may be skipped. In other words, regardless of the signal strength, the equalizer may be rendered operative for a time period corresponding to the time slot assigned to the radio telephone and may be rendered inoperative for the remaining time. In the event that the equalizer is not able to perform signal processing on a real time base, i.e., the equalizer is not able to process signals, which are received in a timeslot, for a time period corresponding to a time slot, the equalizer is rendered inoperative when signal processing for signals received in a timeslot is achieved. According to the modification, compared with the case wherein the equalizer is continuously operative regardless of the time slot, electric power may be greatly conserved. As mentioned above, because it is determined based on the timeslot designation signal included in each time slot whether the timeslot is addressed to the radio telephone or not, the equalizer is actuated in synchronization with the timeslot designation signal addressed to the radio telephone.

Figure 6:
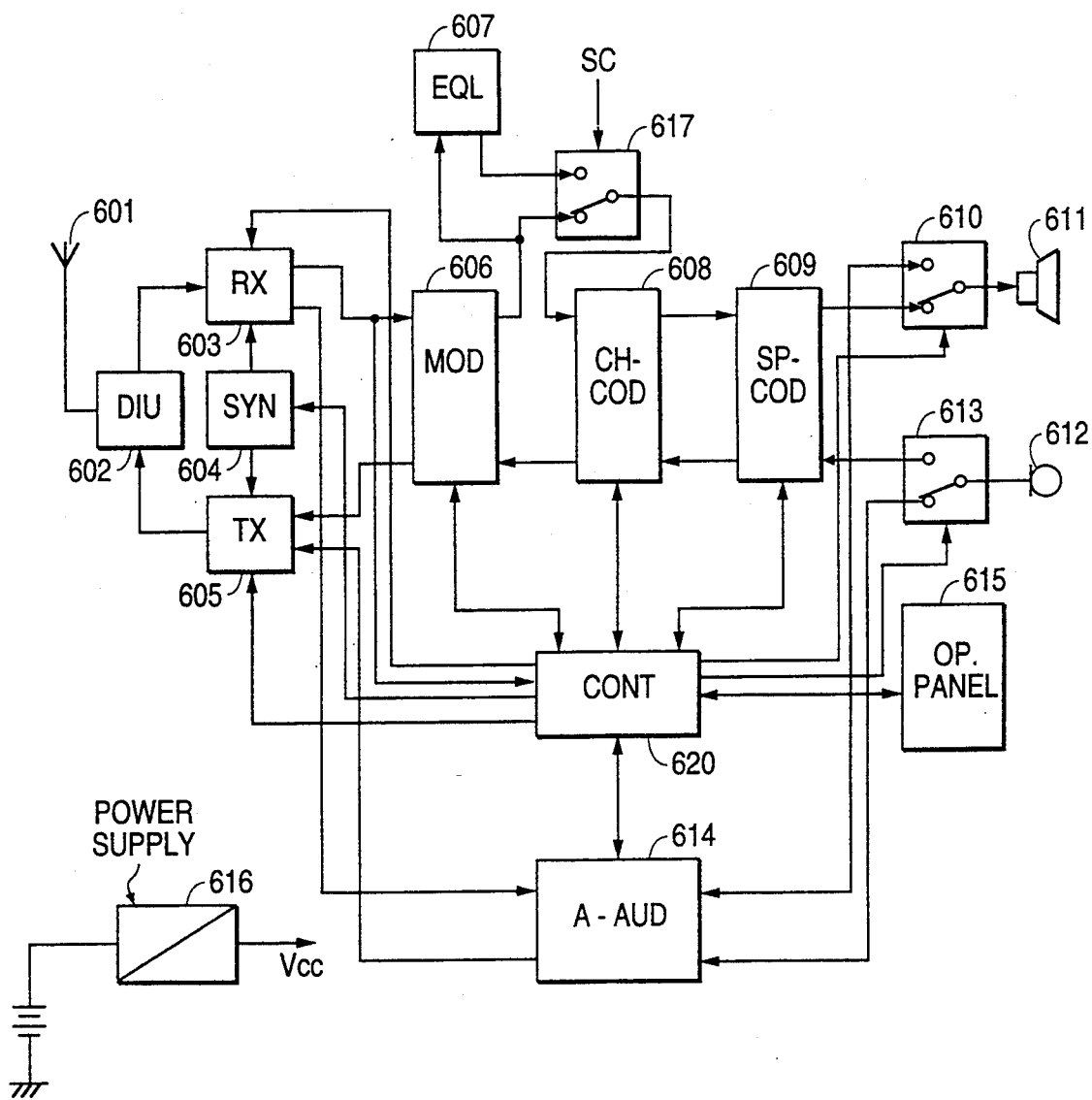
FIG. 6 is a block diagram of a digital cellular radio telephone in accordance with a third embodiment of the present invention.

FIG. 6 is a block diagram showing a dual mode cellular radio telephone according to a third embodiment of the present invention. Referring to FIG. 6, switches 610 and 613 are provided to switch over the operational mode between two modes: an analog mode and a digital mode under the control of controller 620. In the digital mode, switch 610 connects the output of speech coder/decoder (SP-COD) 609 to speaker 611 and switch 613 connects microphone 612 to the input of SP-COD 609. In the analog mode, switch 610 connects the output of analog audio circuit (A-AUD) 614 to speaker 611, and switch 613 connects microphone 612 to the input of A-AUD 614.

In the digital mode, radio frequency signals received at antenna 601 are applied to receiver 603 through duplexer 602. In receiver 603, the radio frequency signals are converted into intermediate frequency (I-F) signals by a local oscillation signals from a synthesizer 604. The I-F signals are demodulated after frame and bit synchronization signals are acquired in a digital modulation/demodulation (MOD) 606. The acquired synchronization signals are sent to a controller 620. MOD 606 extracts digital control signals out of the demodulated signals and sends the digital control signals to controller 620. Digital speech signals included in the demodulated signals are selectively applied to an equalizer 607 or a channel coder/decoder (CH-COD) 608 through a switch 617. Switch 617 is controlled by a control signal SC from controller 620. If the digital speech signals are applied to equalizer 607, signal equalization of the demodulated signals is performed therein. The output of equalizer 607 is coupled to CH-COD 608.

CH-COD 608 deinterleaves the applied signals, performs error detection and correction on the deinterleaved signals by using a cyclic redundancy check technique and a convolutional coding technique. The output of CH-COD 608 is coupled to a speech coder-decoder (SP-COD) 609. In SP-COD 609, the applied digital speech signals are decoded using a prescribed decoding technique and converted into analog speech signals. The analog speech signals are converted into acoustic signals and output from speaker 611.

Speech signals from microphone 612 are reversely processed by SP-COD 609, CH-COD 608, and MOD 606 and transmitted by transmitter 605 through duplexer 602 and antenna 601.

In the analog mode, A-AUD 614 converts the demodulated signals output from RX 603 into analog speech signals and applies the analog speech signals to speaker 611. Also, A-AUD 614 converts speech signals applied from microphone 612 into I-F signals and inputs the speech signals to TX 605.

Operational panel 615 is provided for entering a telephone dial number, a call origination command, etc. Power supply 616 consists of a battery to supply each section of the telephone with electric power.

Figure 7:
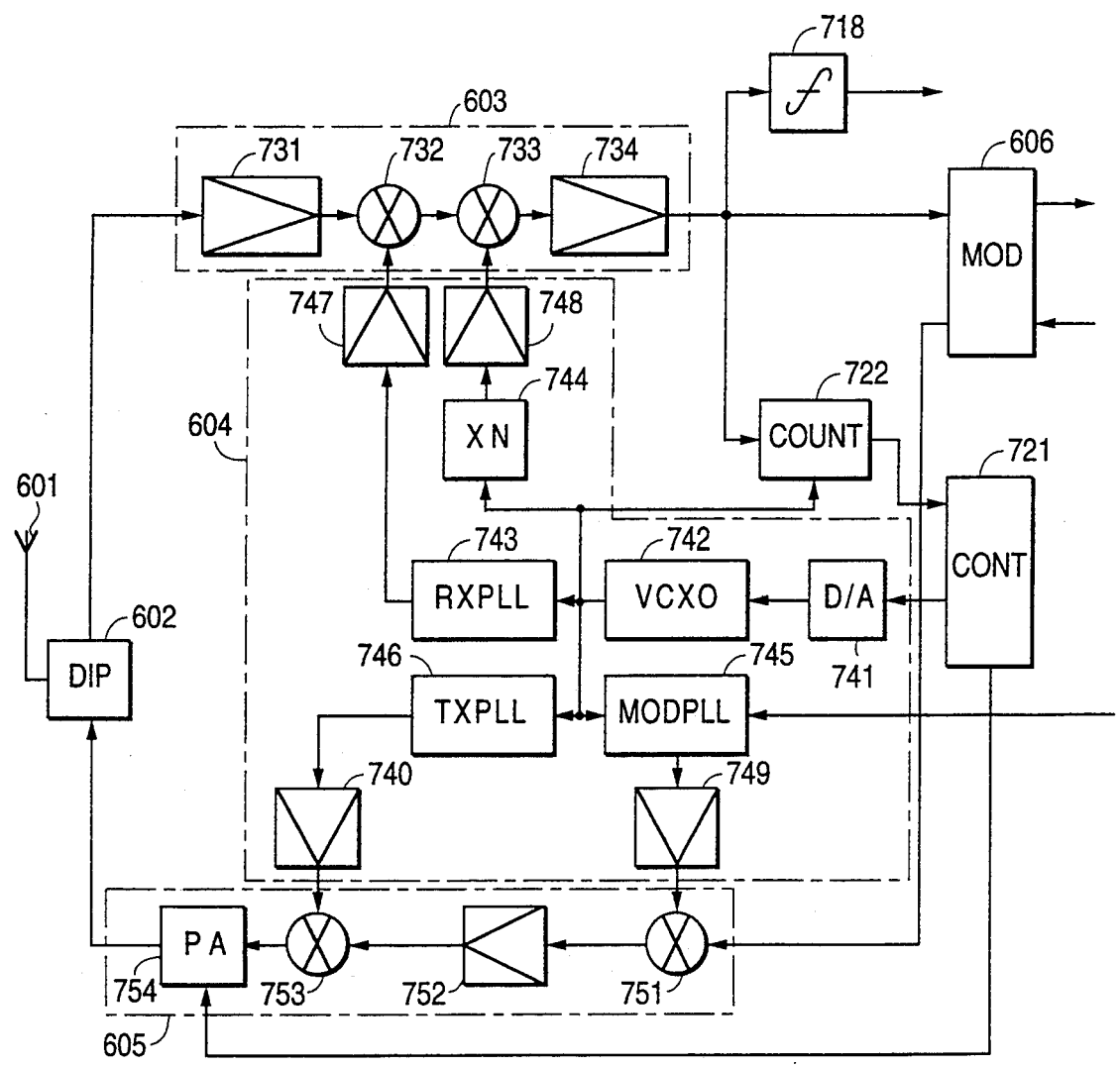
FIG. 7 are block diagrams of receiver 603, synthesizer 604, and transmitter 605 shown in FIG. 6.

FIG. 7 shows block diagrams of RX 603, synthesizer 604 and TX 605 in detail. Referring to FIG. 7, received radio frequency signals are amplified by high-frequency amplifier 731. The output of high-frequency amplifier 731 is coupled to two stages of mixers 732 and 733. The first mixer 732 demodulates the applied signals into first I-F signals and second mixer 733 demodulates the applied signals into second I-F signals. The second I-F signals amplified by I-F amplifier 734 are applied to MOD 606, discriminator 718 provided in A-AUD 614, and frequency counter 722 provided in controller 620.

Digital speech signals output from MOD 606 are applied to a first mixing circuit 751. First mixing circuit 751 converts the applied signals into first I-F signals by mixing with a local oscillation signal supplied from synthesizer 604. Amplified by buffer amplifier 752, the first I-F signals are applied to a second mixing circuit 753. Second mixing circuit 753 modulates the applied signals into a second I-F signal by mixing with a local oscillation signal supplied from synthesizer 604. The output signal from the second mixing circuit 753 is amplified by power amplifier (PA) 754 and transmitted through duplexer 602 and antenna 601.

In radio link establishment operations of the third embodiment, an automatic frequency control (AFC) is employed. According to the AFC operation, a frequency of the transmission channel is determined on the basis of a frequency of the reception channel. Referring to FIG. 7 again, the second I-F signal output from receiver circuit 603 in counted by counter 722. The count value is sent to controller 620. Controller 620 generates a digital value corresponding to the count value and sends it to digital/analog (D/A) converter 741. The output voltage from D/A converter 741 is applied to voltage controlled crystal oscillation circuit (VCXO) 742. VCXO 742 generates an AFC signal of a frequency corresponding to the applied voltage. The AFC signal is applied to reception phase lock loop circuit (RXPLL) 43, multiplexing circuit 744, modulation phase lock loop circuit (MODPLL) 745, and transmission phase lock loop circuit (TXPLL) 746.

RXPLL 743 and multiplexing circuit 744 generates the first local oscillation frequency signal and the second local oscillation frequency signal, respectively, which result from the AFC signal. The local oscillation signals are applied to first and second mixing circuit 732 and 733 through buffer amplifiers 747 and 748. Consequently, the frequency of the second I-F signal may be stabilized with accuracy of the received radio frequency signals.

Modulation phase lock loop circuit (MODPLL) 745 and TXPLL 746 generate a transmission I-F signal and a transmission local oscillation frequency signal, respectively, which result from the AFC signal. The transmission I-F signal and the transmission local oscillation frequency signal are applied to first mixing circuit 751 and second circuit 753 through the buffer amplifiers 749 and 740. Consequently, the frequency of the radio frequency signal transmitted from the transmitter 605 is determined on the basis of the frequency of the reception channel. In other words, the transmission frequency is tuned to be spaced a predetermined frequency width from the reception frequency.

Next, operations in a radio link establishment in accordance with the third embodiment of the present invention will be described in reference with FIG. 8. FIG. 8 shows an operational sequence for explaining the operations in the radio link establishment. When a mobile station (MT), which is the cellular radio telephone of the present embodiment, is turned on, a control radio channel (C-CH) is established between the MT and a base station (BS) after each of the circuits in the MT is initialized. The MT receives system information data and other control data over the C-CH and renews the control data in to MT on the basis of the received data.

Next, the MT seeks to establish a paging channel (P-CE) by measuring the strength of the received signal. The paging channel is determined so that the strength of the signals which are received over the paging channel are strongest among the prescribed number of radio channels. The MT continues waiting for signals transmitted over the paging channel, and thus enters a standby state.

In the event that a user wishes to call in the standby state, controller 620 initiates a radio link establishment operation in accordance with the flow chart of FIG. 9. In step 4a, a reception channel is first selected by detecting a radio channel having a strongest signal strength out of a prescribed number of radio channels. On the basis of the frequency of the reception channel, a transmission channel is determined. The frequency separation between the reception channel and the transmission channel is preferably 45 MHz. Thus, reception and transmission frequencies for a speech radio link are determined in accordance with the automatic frequency control operation. In the event that a user wishes to call in the standby state, equalizer 607 is not supplied power and a terminal b from MOD 606 is selected so that the output from MOD 606 is coupled to CH-COD 608 under controls of controller 620 (step 4b). Consequently, the received signals are directly applied to CH-COD 608 without passing through equalizer 607.

Upon a selection of a radio frequency for the reception channel, controller 620 enters a synchronization acquisition operation and starts counting time passage from the time that the operation starts using an internal timer of controller 620 (step 4c). In step 4d, controller 620 obtains a synchronization word from CH-COD 608, which is extracted out of the received signals in CH-COD 608, and determines if synchronization with the received signals has been acquired (step 4e). Still, controller 620 determines if the time passage counted by the internal timer exceeds a predetermined time period (step 4f). If it is determined that the synchronization with the received signals is acquired in step 4e, the operation goes to steps 4i and 4j. In the steps, controller 620 determines if the transmission frequency controlled on the basis of the reception frequency is stabilized within ±200 Hz. If it is determined that the transmission frequency is stabilized within ±200 Hz, the operation goes to step 4k (FIG. 9B) and a shortened burst signal sequence is transmitted to the base-station in step 4k. The shortened burst signal sequence consisting of a combination of various kinds of flame patterns and zero bit pattern is used for measuring transmission time delay between the mobile unit and the base station.

Upon a reception of the shortened burst signal sequence, the base station calculates the transmission time delay on the basis of the reception timing of the shortened burst and replies with a response signal having time alignment information corresponding to the time delay. In step 4l, the mobile unit BU waits for the response signal. Upon a reception of the response signal, transmission timing is determined in the mobile unit in accordance with the time alignment information included in the response signal (step 4m). In step 4n, it is determined whether the transmission frequency, on the basis of the reception frequency, is stabilized within ±50 Hz. When it is determined that the transmission frequency is stabilized within ±50 Hz, it is judged that received signals may be applied to equalizer 607 and the operation goes to step 4p. In step 4p, equalizer 607 is rendered to be operative and the terminal a from equalizer 607 is selected to be connected to CH-COD 608 in switch 617 under the control of controller 620. Consequently, equalizer 607 is inserted into the signal path between MOD 606 and CH-COD 608. The received signals are first equalized by equalizer 607 and then applied to CH-MOD 608. Thereby, even if the multipath fading occurs in the established speech radio link, signal distortion caused by the multipath fading may be compensated for by equalizer 607 so that the error rate of signals received by the mobile unit MU is reduced. Upon the actuation of equalizer 607, speech signals may be transmitted over the established speech radio link, thereby a speech communication becomes available between the base station BS and the mobile unit MU.

If the time passage exceeds the predetermined time period in step 4f before synchronization with the received signals is acquired in step 4e, controller 620 has determined that the synchronization with the received signals may not be acquired in time without employing equalizer 607 and the operation goes to step 4g. In the step 4g, controller 620 controls switch 617 so that the terminal a from equalizer 607 is selected to be connected to CH-MOD 608. Thereby, the output signals from MOD 606 is applied to CH-MOD 608 through equalizer 607.

If the transmission frequency which is automatically controlled on the basis of the reception frequency is stabilized within ±50 Hz, signal distortion of the output signals from MOD 606 is compensated for by equalizer 607 and applied to CH-MOD 608. Therefore, even if the synchronization with the received signals is not acquired due to the multipath fading, the synchronization will be acquired on the basis of the compensated signals. Even if the multipath fading occurs excessively, the synchronization with the received signals is still accurately and rapidly acquired.

As mentioned in the above description, according to this embodiment, since the mobile unit performs operations for an establishment of a digital radio link (e.g., seizure of the synchronization with the received signals) without using equalizer 607 for a predetermined time period from the time when a digital speech radio link establishment operation is initiated, it is not necessary to wait for frequency stabilization which is normally required for the operation of equalizer 607. Therefore, the digital speech radio link may be rapidly established. Still, since equalizer 607 is not inserted into the signal path until the reception frequency is stabilized to a certain extent, equalizer 607 does not need to cover a wide range of frequencies, thereby the circuit arrangement of equalizer 607 is not so complicated that the cost in manufacturing the equalizer is reduced.

Furthermore, since equalizer 607 is employed after the reception frequency is stabilized within a prescribed frequency range, signal distortion caused by the multipath fading which occurs in transmitting speech signals may be compensated for by the equalizer. This is effective because the speech signals have a greater volume of information than the control signals transmitted in a digital speech radio link establishment phase.

This embodiment may be modified such that equalizer 607 is removed from the signal path in the event that the reception frequency fluctuates over the prescribed frequency range after the speech radio link has been established. According to this modification, the speech radio link may be kept to be established even after the reception frequency fluctuates over the prescribed frequency range because the quality of the received signals is not degraded due to wrongful operations of the equalizer on the fluctuated frequency.

Still, two switches may be provided at input and output terminals of the equalizer so that the received signals are not applied to the equalizer when the equalizer is not employed. Further, when the equalizer is not employed, the equalizer may not be supplied with electric power. Alternatively, if the equalizer is embodied by a CMOS logic device, the clock supply to the device is terminated while the equalizer is not used.

This invention is not restricted to the above-described embodiments. Although the present invention is applied to a mobile unit in the above-described embodiments, it is apparent that the present invention may be applied to a base station serving for the mobile units in a digital cellular system.

What is claimed is:

1. A radio telecommunication apparatus connectable to a base station over a radio channel wherein a call is being made from a standby state, comprising:
  digital circuitry, wherein said digital circuitry includes,
    receiving means for receiving radio frequency signals;
    first demodulating means coupled to said receiving means for demodulating the received radio frequency signals and outputting baseband signals;
    equalizing means for equalizing the baseband signals and outputting equalized baseband signals;
    decoding means for decoding signals supplied to an input terminal thereof;
    a switch for selectively connecting said input terminal of said decoding means to either said demodulating means or said equalizing means, wherein said equalizing means is inoperative and not supplied with electric power when not connected to said input terminal; and
    control means for controlling said switch;
  analog circuitry, wherein said analog circuitry includes,
    receiving means for receiving radio frequency signals;
    second demodulating means coupled to said analog circuitry receiving means for demodulating the received radio frequency signals and outputting demodulated signals;
    converting means for converting the demodulated signals into analog speech signals; and
    means for outputting the analog speech signals;
  means for acquiring synchronization with the received radio signals;
  means for determining whether synchronization with the received radio signals has been obtained within a predetermined time by said synchronization acquiring means;
  means for detecting whether a transmission frequency related to the received radio signals is within a predetermined frequency range;
  wherein said control means is responsive to said determining means to control said switch to connect said input terminal of said decoding means to said equalizing means when synchronization is not obtained within the predetermined time;
  wherein said control means is responsive to said detecting means to control said switch to connect said input terminal of said decoding means to said equalizing means when said transmission frequency is within the predetermined frequency range; and
  wherein said control means controls said switch to connect said input terminal of said decoding means to said first demodulating means initially when said call is to be made.

* * * * *